Feb. 10, 1925.
T. H. THOMAS
1,525,628
FLUID PRESSURE BRAKE DEVICE
Filed March 10, 1924
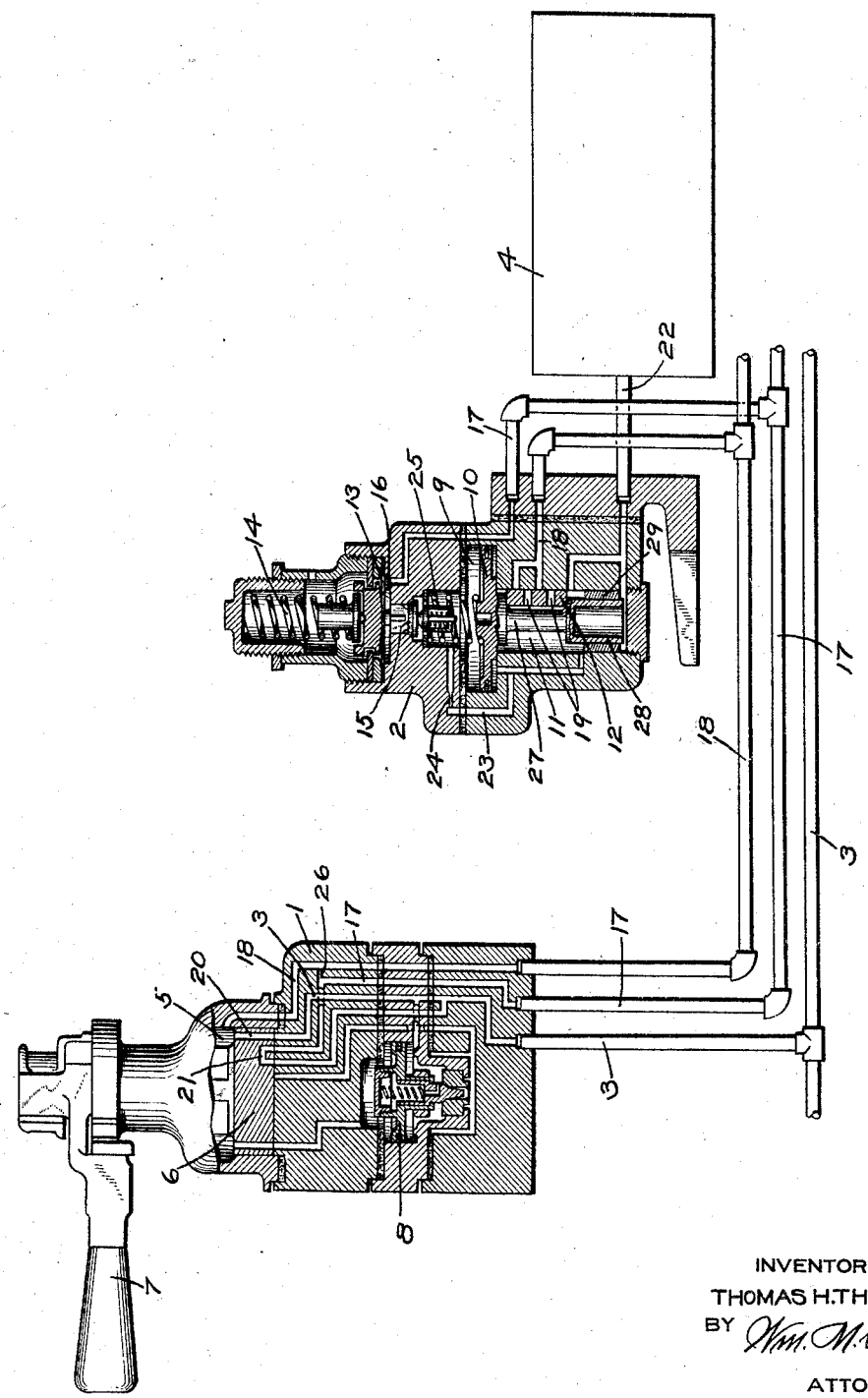
INVENTOR
THOMAS H.THOMAS
BY *Wm. M. Cady*
ATTORNEY Patented Feb. 10, 1925.

1,525,628

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed March 10, 1924. Serial No. 698,037.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to means for charging, recharging, and maintaining the fluid pressure in the brake pipe.

The principal object of my invention is to provide improved means for controlling the fluid pressure in the brake pipe.

In the accompanying drawing, the single figure is a sectional view of apparatus for controlling the fluid pressure in the brake pipe and embodying my invention.

As shown in the drawing, the apparatus comprises a brake valve device 1, a feed valve device 2, a brake pipe 3, and a main reservoir 4.

The brake valve device 1 comprises a casing having a valve chamber 5, containing a rotary valve 6, adapted to be operated by a handle 7 and said casing may also contain the usual equalizing discharge valve mechanism 8.

The feed valve device 2 may comprise a casing having a piston chamber 9 containing a piston 10 and a valve chamber 11, containing a slide valve 12. The regulating portion of the feed valve device may comprise a flexible diaphragm 13, subject on one side to the pressure of an adjustable coil spring 14 and adapted to control the operation of a valve 15 interposed between the piston chamber 9 and the diaphragm chamber 16.

Said diaphragm chamber is open to a pipe and passage 17 which I will call the feed valve control pipe and said pipe and passage leads to the seat of the rotary valve 6. A feed valve supply pipe and passage 18 leads from the seat of slide valve 12 to the rotary valve chamber 5.

The slide valve 12 is provided with large capacity ports 19 adapted in the feed position of the slide valve to register with corresponding ports leading to the feed valve supply pipe 18.

In operation, when the brake valve handle 7 is turned to release position, as shown in the drawing, a through port 20 in the rotary valve 6, connects the rotary valve chamber 5 with the brake pipe 3 and a cavity 21 in the rotary valve connects the brake pipe 3 with the feed valve control pipe 17.

If the pressure in the brake pipe is less than the standard pressure carried in the brake pipe, as determined by the adjustment of the spring 14, the diaphragm 13 will be operated by the spring 14 so as to move the valve 15 from its seat. With the valve 15 seated, and the valve chamber 11 charged through pipe 22 with fluid under pressure from the main reservoir 4, fluid equalizes from valve chamber 11 into piston chamber 9 through a passage 23 having a restricted port 24, so that piston 10 is maintained in the position shown in the drawing by spring 25.

When the valve 15 is unseated, fluid under pressure is vented from piston chamber 9 to the feed valve control pipe 17 and thence to the brake pipe 3 by way of cavity 21 in the rotary valve 6, and piston 10 is then operated by the higher pressure in valve chamber 11, to shift the slide valve 12 so that ports 19 register with the supply ports leading to the feed valve supply pipe 18. Fluid under pressure from the main reservoir 4 and the valve chamber 11 is thus supplied to pipe 18 and thence to the rotary valve chamber 5. From valve chamber 5 fluid is supplied through port 20 to the brake pipe 3. When the pressure in the brake pipe and in the diaphragm chamber 16 has been increased to the standard pressure, the diaphragm 13 is operated so as to permit the valve 15 to seat. Fluid pressure then equalizes through passage 23 into piston chamber 9, permitting the spring 25 to return the piston 10 and slide valve 12 to the inner position as shown in the drawing, in which the supply of fluid from the main reservoir to the brake pipe is cut off.

By connecting the regulating diaphragm chamber 16 to the brake pipe by way of the feed valve control pipe and the brake valve device instead of at the feed valve supply port leading to the brake pipe, the operation of the regulating diaphragm will be subject more nearly to the actual pressure conditions in the brake pipe and this is especially desirable where, as in the present case, the feed valve device is provided with large capacity feed ports, since the more rapid build up of pressure at the feed valve supply port would act on the regulating diaphragm to cause intermittent opening and closing of the feed valve and a consequent delay in effecting the release of the brakes and the recharging of the brake pipe.

With a double end equipment having a brake valve at each end of the car, should the rotary valves of both brake valves be in the handle off position, in which the charging ports are closed, and should leakage occur from the feed valve supply pipe 18, the pressure in the rotary valve chamber 5 might also be reduced and might thus permit the brake pipe pressure acting on the under side of the rotary valve to lift the valve from its seat. In order to prevent this, a restricted port 26 is provided which connects the feed valve supply pipe 18 with the feed control pipe 17. With this arrangement, any leakage from the supply pipe 18 will cause a reduction in pressure in the control pipe 17 and thus on the regulating diaphragm 13, so that the feed valve device will then operate to supply fluid under pressure to the supply pipe 18 and thus maintain the pressure in the rotary valve chamber 5.

The piston stem 27 of the piston 10 may be provided with a cylindrical end portion 28 adapted to operate in a guide bushing 29, so as to provide improved wearing conditions and to assist in maintaining the piston 10 in proper alinement.

Having now described my invention, what I claim as new and desire to secure by Letters Patent, is:—

1. In a fluid pressure brake apparatus, the combination with a brake pipe, of a feed valve device comprising a supply portion for controlling the supply of fluid under pressure to the brake pipe and a regulating portion subject to brake pipe pressure supplied from a point remote to the feed valve device for controlling the operation of said supply portion.

2. In a fluid pressure brake apparatus, the combination with a brake pipe and a brake valve device, of a feed valve device, operated according to the pressure of fluid in the brake pipe as supplied at said brake valve device for controlling the supply of fluid under pressure to the brake pipe.

3. In a fluid pressure brake apparatus, the combination with a brake pipe and a brake valve device, of a feed valve device comprising a supply portion for controlling the supply of fluid under pressure to the brake pipe, a regulating portion subject to brake pipe pressure for controlling the operation of said supply portion, and means controlled by said brake valve device for connecting the brake pipe to said regulating portion.

4. In a fluid pressure brake apparatus, the combination with a brake pipe and a brake valve device, of a feed valve control pipe, a feed valve device operated upon a reduction in pressure in said control pipe for supplying fluid under pressure to the brake pipe, and means controlled by said brake valve device for connecting the brake pipe to said control pipe.

5. In a fluid pressure brake apparatus, the combination with a brake pipe, of a feed valve control pipe, a feed valve device operated according to the pressure in said control pipe for controlling the supply of fluid under pressure to said brake pipe, and a brake valve device having a rotary valve adapted in release position to connect the brake pipe with said control pipe.

6. In a fluid pressure brake apparatus, the combination with a brake pipe and a brake valve device having a valve chamber containing a rotary valve, of a feed valve control pipe, and a feed valve supply pipe, a feed valve device operated upon a reduction in pressure in said control pipe for supplying fluid under pressure to the feed valve supply pipe, said control pipe and said feed valve supply pipe being constantly connected through a communicating passage.

7. In a fluid pressure brake apparatus, the combination with a brake pipe and a brake valve device having a valve chamber containing a rotary valve, of a feed valve control pipe, and a feed valve supply pipe, a feed valve device operated upon a reduction in pressure in said control pipe for supplying fluid under pressure to the feed valve supply pipe, said control pipe and said feed valve supply pipe being constantly connected through a restricted passage.

8. In a fluid pressure brake apparatus, the combination with a brake pipe, of a feed valve control pipe, a feed valve supply pipe, a feed valve device operated upon a reduction in feed valve control pipe pressure for supplying fluid under pressure to said supply pipe, a brake valve device having a position for connecting said supply pipe to the brake pipe, and a passage constantly connecting said supply pipe to said control pipe.

9. In a fluid pressure brake apparatus, the combination with a brake pipe, of a feed valve control pipe, a feed valve supply pipe, a feed valve device operated upon a reduction in feed valve control pipe pressure for supplying fluid under pressure to said supply pipe, and a brake valve device having a rotary valve adapted in one position to connect said supply pipe to the brake pipe, and the brake pipe to said control pipe.

10. In a fluid pressure brake apparatus, the combination with a brake pipe, of a feed valve control pipe, a feed valve supply pipe, a feed valve device operated upon a reduction in feed valve control pipe pressure for supplying fluid under pressure to said supply pipe, and a brake valve device having a rotary valve provided with means adapted in release position to connect said supply pipe and said control pipe with the brake pipe.

In testimony whereof I have hereunto set my hand.

THOMAS H. THOMAS.